Dec. 17, 1940.  M. E. COLLINS  2,224,899
FILM REEL DRIVE MECHANISM
Filed March 30, 1937
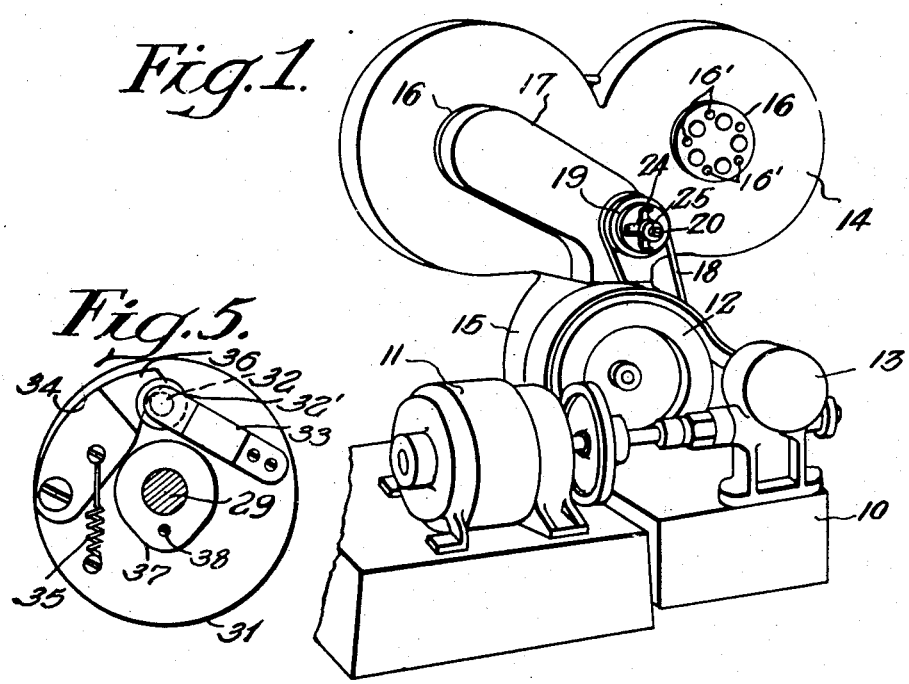
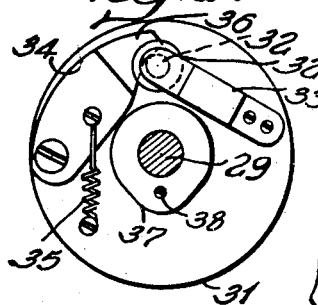
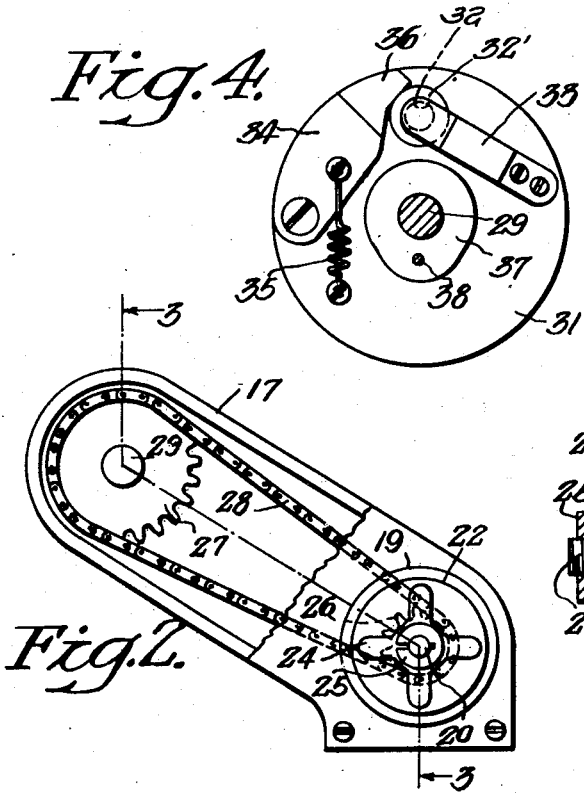
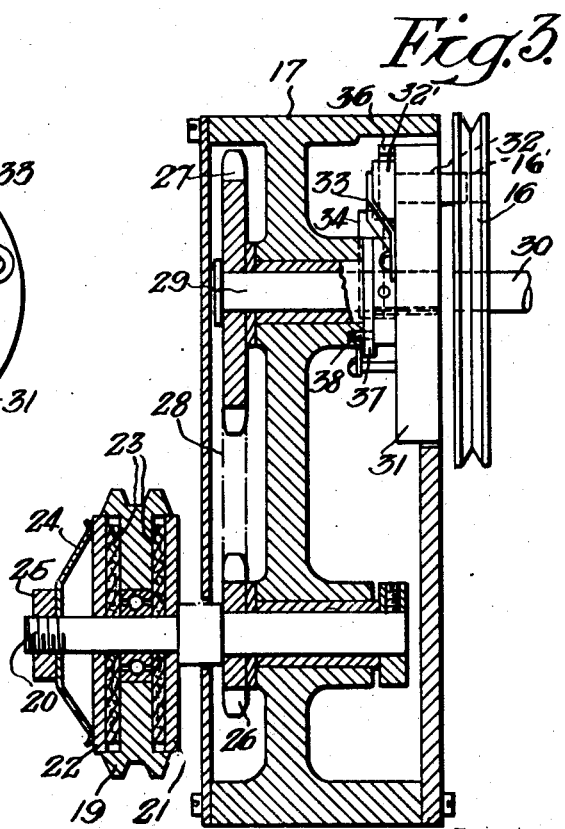
Inventor
Milford E. Collins
Attorney Patented Dec. 17, 1940

2,224,899

UNITED STATES PATENT OFFICE 2,224,899

FILM REEL DRIVE MECHANISM

Milford E. Collins, Hollywood, Calif., assignor to Radio Corporation of America, a corporation of Delaware Application March 30, 1937, Serial No. 133,766

3 Claims. (Cl. 242—55)

This invention relates to improved film reel drive mechanisms such as are utilized in connection with motion picture cameras or sound recorders.

In sound recorders and motion picture cameras, it is customary to utilize a magazine enclosing two film reels. Unexposed film is wound on one of these reels and is fed through apertures in the magazine into the apparatus and then back to the other reel. It is necessary to drive the second reel in order to take up the film, and this drive has heretofore been customarily accomplished by means of a belt which was slipped over a pulley on the reel shaft. Such an arrangement presents the disadvantage that a certain amount of time is required to remove the belt when removing the magazine, and to replace the belt on the fresh magazine. This is particularly disadvantageous in sound recording, where the rear of the sound recorder, where the take-up belt is located, is not always readily accessible and where occasionally magazines must be changed very rapidly.

The present invention involves a mechanism which may be substituted for the customary drive belt, and which permits magazines to be changed without any appreciable delay and without any loss of time in disconnecting or connecting belts. I accomplish this result by the engagement of the apertures in the customary take-up pulley on the film magazine, instead of engaging the periphery thereof. This device is provided with a depressible pin which does not interfere with the removal or replacement of the magazine, and which is automatically caused to engage an appropriate aperture upon the starting of the recorder. Slip of the take-up drive to accommodate varying quantities of film on the reel, and corresponding variations in reel speed, is provided by a spring-controlled friction clutch, instead of depending upon the slip of a belt.

One object of my invention is to provide a take-up drive mechanism which facilitates exchanging film magazines.

Another object of my invention is to provide a take-up drive mechanism which is more positive in its operation than a belt drive.

Another object of my invention is to provide a drive mechanism which will be caused to positively engage the magazine pulley upon the starting of the apparatus.

Another object of my invention is to provide a drive mechanism including a retractable driving pin for engaging the magazine pulley.

Other and incidental objects of my invention will be apparent to those skilled in the art from a reading of the following specification and an inspection of the accompanying drawing, in which:

Figure 1 shows my improved take-up drive as applied to a commercial type of sound-on-film recorder, this figure showing a rear view of the recorder, Figure 2 shows the rear view of the take-up drive with the cover partly broken away, Figure 3 is a section taken on the line 3—3 of Fig. 2, and Figure 4 is a rear view of the pin clutch which engages the magazine pulley.

Fig. 5 is a view similar to that of Fig. 4 showing the pin clutch retracted.

Referring first to Fig. 1, which shows a commercial type of sound-on-film recorder, the recorder base 10 carries the driving motor 11, which drives the film drum flywheel 12 through appropriate gearing 13 and such other intermediate irregularity absorbing connections as may be appropriate, such, for example, as the magnetic drive shown in Kellogg Reissue Patent No. 19,270.

The unexposed film is carried in the right hand side of the magazine 14, and the exposed film is taken up at the left hand side thereof, the film passing from the right hand side into the recorder casing 15 through the bottom of the magazine, and then passing upwardly from the casing 15 into the left hand side of the magazine. Both reel shafts are provided with pulleys, as indicated at 16, the one on the left hand side of the device being partly obscured by my take-up drive mechanism 17. It will be apparent that these pulleys have circular holes 16' in them, uniformly spaced near the periphery, and my device drives the take-up reel by engaging one of these holes instead of by means of a belt engaging the grooved periphery.

The take-up device 17 itself is driven by the usual belt 18 from a pulley on the recorder mechanism. This belt passes over a pulley 19 on the take-up drive and drives the shaft 20 through the clutch plates 21 and 22 and the friction discs 23. The discs 23 may be of any appropriate material, such as felt or leather, and serve to provide proper frictional engagement between the pulley 19 and the stationary plate 21 and slidable plate 22. The plate 22, with its accompanying friction disc, is pressed against the pulley 19 by the spring 24, and the pulley 19 is thereby pressed toward the clutch plate 21.

An appropriate adjusting nut 25 is provided for adjusting the pressure of the spring 24, and thereby adjusting the torque applied to the shaft 20. This shaft 20 carries a sprocket 26 which drives a second sprocket 27, through a silent chain 28. The sprocket 27 is mounted on a shaft 29, which is so positioned in the casing 17 of the device as to be in alignment with the shaft of the magazine take-up reel 30, which carries the pulley 16.

This shaft 29 carries on its face adjacent the pulley 16 a driving disc 31, which is fixed to the shaft 29 and carries a driving pin 32 adapted to engage one of the holes in the pulley 16 and pressed toward the pulley 16 and into the appropriate hole by means of a spring 33.

From the preceding explanation, it will be apparent that I have provided a compact and efficient take-up drive having an appropriate friction clutch and a positive engagement with the take-up pulley. However, in order to facilitate exchanging magazines, it is necessary that the driving pin 32 be retractable from engagement with the pulley, and that it be automatically brought into engagement with the pulley when the device is started. In order to do this, I provide a lever 34, which is pressed toward the pin 32 by a spring 35 and which is cut away at the end 36 in order that it may slip under the head 32' of the pin 32 when the pin is pressed into the driving disc 31.

After a film magazine has been removed, the pin 32 is pressed into the disc 31 and retained there by the lever 34 which slips under the pin head 32' and retains it in such a position as to free it from engagement with the pulley 16. In order to cause the pin 32 to engage the pulley 16 upon starting of the device, a stationary cam 37 is provided on the shaft 29, and is fixed to the casing 17 by a screw 38.

When the magazine is in place, and the device properly threaded and started, as the shaft 29 rotates with the driving disc 31, the heel shown on the lever 34 engages the projecting portion of the cam 37 and is thereby withdrawn from beneath the head 32' of the driving pin 32, permitting the spring 33 to force the driving pin toward the disc pulley 16, and into the appropriate hole by which it is to be driven.

It is not necessary that the pin 32 be manually pressed into the disc 31 after the removal of the magazine, as when a fresh magazine is placed in position, if the pin 32 does not happen to be in alignment with one of the holes in the pulley 16, the face of the pulley will depress the pin, after which the pin will be caused to engage the pulley on the starting of the device, as above described.

The depression of the pin 32, whether accomplished manually or by the pulley 16, leaves the take-up reel free to rotate to facilitate fastening of the film or the taking up of excess film while threading, and the releasing of the pin by the cam 37 thereafter connects the pin to the pulley 16 on the starting of the recorder.

It will be apparent that my invention is not limited to the specific details shown and described, but that I may substitute other appropriate equivalents, such, for example, as a gear train for the chain 28, or other appropriate retaining and releasing means for the lever 34.

Having now described my invention, I claim:

1. Apparatus of the class described comprising a driving disc member, an apertured driven member, depressible pin means carried by said driving disc member for engaging the apertures in said driven member, means yieldably urging said pin means toward said driven member, means attached to said drive member and adapted to rotate therewith for retaining said pin means in a retracted position, resilient means for urging said retaining means toward said pin means, and stationary cam means adapted to contact and thereby release said pin means from the retracted position upon actuation of the drive member.

2. An automatic device for connecting a driving member with a driven member comprising a driving disc member, a driven member having apertures therein, a depressible pin mounted on said driving disc and adapted to be inserted in the apertures of said driven member, said pin being normally urged toward said apertures, a lever pivoted on said driving disc member and resiliently urged toward said pin, said lever maintaining said pin out of said apertures in one position of said pin, and means movable relative to said driving disc member for urging said lever away from said pin.

3. An automatic device for driving a film take-up reel comprising a driving disc member concentrically mounted with respect to said take-up reel, a pin adapted to pass through said driving disc member and to engage in apertures of said reel, means for resiliently urging said pin toward said reel apertures, a member adapted to contact said pin and maintain it out of engagement with said reel apertures, and stationary means adapted to remove said pin contacting member from said pin upon rotation of said driving disc member to permit said pin to engage said apertures.

MILFORD E. COLLINS.